United States Patent [19]

Lewis et al.

[11] 3,880,472

[45] Apr. 29, 1975

[54] HYDRAULIC BRAKING SYSTEM FOR A TRAILER

[75] Inventors: Richard L. Lewis; Robert K. Wilson; George B. Hickner, all of South Bend, Ind.

[73] Assignee: The Bendix Corporation, South Bend, Ind.

[22] Filed: Nov. 19, 1973

[21] Appl. No.: 417,458

[52] U.S. Cl. .......................... 303/7; 188/3 R; 303/10

[51] Int. Cl. .............................................. B60t 13/16

[58] Field of Search ............... 303/7, 6 R, 10, 15, 2, 303/3, 20, 64, 61, 21 F, 29; 188/3, 158, 163

[56] References Cited

UNITED STATES PATENTS

| | | | |
|---|---|---|---|
| 2,985,489 | 5/1961 | Stelzer | 303/7 |
| 3,276,822 | 10/1966 | Lister | 303/10 UX |
| 3,747,992 | 7/1973 | Schnipke | 303/29 |

*Primary Examiner*—Trygve M. Blix
*Assistant Examiner*—D. C. Butler
*Attorney, Agent, or Firm*—Leo H. McCormick, Jr.; William N. Antonis

[57] ABSTRACT

A tow vehicle-trailer braking system where a transducer in the brake line of the tow vehicle and a transducer in the brake line of the trailer are evaluated by a comparator to develop an operational signal to operate the wheel brakes of the trailer. The operational signal positions a solenoid valve to regulate the communication of fluid under pressure to the wheel brakes of the trailer. The fluid under pressure is developed by a pump. The pump is driven by a cam attached to the wheel of the trailer until the predetermined pressure level for the fluid is reached. Upon reaching this predetermined pressure, the pressurizing piston in the pump becomes disengaged from the cam.

14 Claims, 9 Drawing Figures

12
164
14

33
44
39
46
36
34
38
37
42
32
48
35
CONTROL VALVE SOLENOID
40
30
ELECTRICAL SWITCH
26
COMPARATOR 1
COMPARATOR 2
28
$B_1$
$B_2$

PRESSURE TRANDUCER 1
16
22
24
RELAY
20
18
PRESSURE TRANDUCER 2

HYDRAULIC BRAKING SYSTEM FOR A TRAILER

BACKGROUND OF THE INVENTION

With an ever increasing number of recreational trailers being sold there is a need to improve the braking capabilities over the electric brakes now commonly available. Hydraulically operated brakes can achieve far greater braking potential, however, synchronization of the brakes in the tow vehicle and the trailer must be coordinated to provide smooth braking for the combination.

In U.S. application Ser. No. 365,798 filed May 31, 1973 it is disclosed how an electrical signal can be generated to provide an operational signal for a solenoid valve. The solenoid valve regulates the creation of vacuum and air across a wall means to develop a pressure differential which will pressurize a hydraulic fluid for operating the brakes of a trailer. However, with present emission control devices the vacuum produced in the engine of the tow vehicle is expected to be reduced.

In U.S. application Ser. No. 217,983, filed Jan. 14, 1973 and now U.S. Pat. No. Re. 28,191 it is disclosed how pressurized air and air can be used to operate a pressure differential servomotor. In this regard it is conceivable that an electric air pump located in the trailer could produce sufficient braking for a trailer. However, such an electric air pump would require a high current line from the tow vehicle.

SUMMARY OF THE INVENTION

We have devised a tow vehicle-trailer braking system wherein a pumping means located in the trailer is driven by the rotation of a trailer wheel to produce pressurized hydraulic for operating the brakes in the trailer in response to an actuation signal. The actuation signal is derived by comparing the brake line pressure in the tow vehicle with that in the trailer.

It is therefore the object of this invention to provide a tow vehicle-trailer braking system with a pumping means to produce a fluid under pressure for operating the wheel brakes of the trailer in response to a braking signal derived by comparing the brake line pressure in the tow vehicle with that of the trailer.

It is another object of this invention to provide a tow vehicle-trailer braking system with means of synchronizing the actuation of the wheel brakes of the trailer with that of the tow vehicle.

It is still a further object of this invention to provide a tow vehicle with a valve means responsive to an actuation signal derived by sensing the brake line pressure supplied to the wheel brakes of the two vehicle with that of the trailer.

It is still another object of this invention to provide a tow vehicle trailer-braking system with pumping means driven by the rotation of a wheel on the trailer until an operational fluid reaches a predetermined level.

It is still another object of this invention to provide a tow vehicle-trailer braking system with a means to disengage a pumping means from a drive wheel on the trailer when an operational fluid level reaches a predetermined pressure level.

These and other objects will become apparent from reading this specification and viewing the drawing.

DETAILED DESCRIPTION OF THE PREFERRED EMBODIMENT

Figure 1:
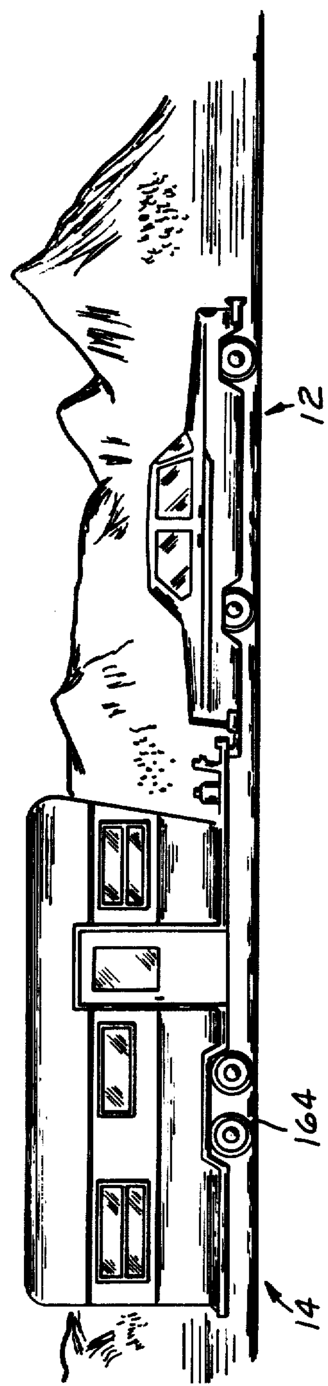
FIG. 1 is a schematic illustration of a tow vehicle-trailer combination wherein the braking system device in this invention can be utilized.
Figure 2:
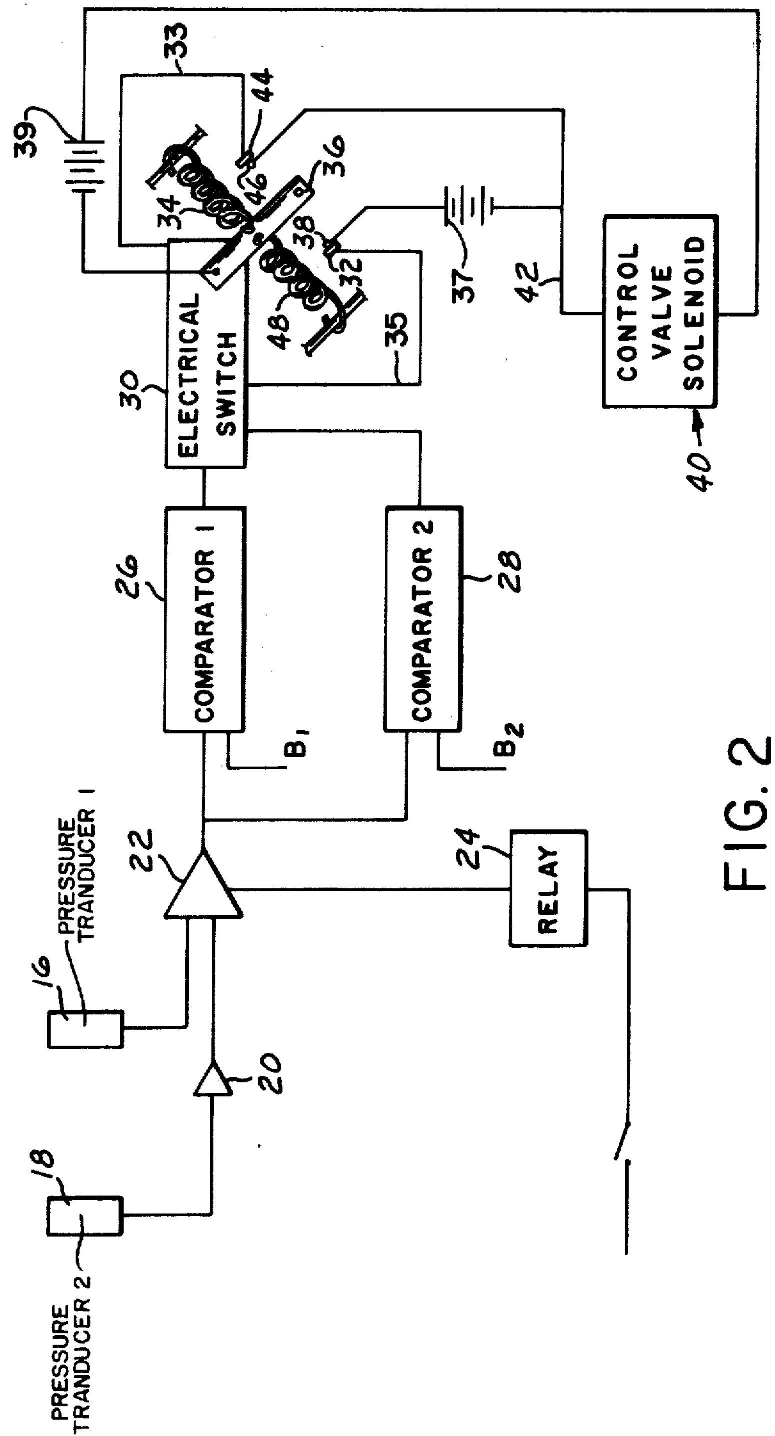
FIG. 2 is a schematic illustration of an electrical circuit for sensing and comparing brake line pressures to develop an operational signal for the wheel brakes of the trailer.

The tow vehicle 12 and trailer 14 in FIG. 1 is typical of the recreational vehicle combinations which travel the highways. These highways can vary from a horizontal plane to mountainous slopes and thereby the wheel brakes on the combination must be matched in order to provide effective braking in time of need. This matching or synchronization of the brakes is schematically illustrated in FIG. 2, by locating a first pressure transducer 16 in the brake line of the tow vehicle 12 and a second pressure transducer 18 in the brake line of the trailer 14. A signal $V_c$ representative of the brake line pressure in the tow vehicle is generated in the first pressure transducer 16 and a signal $V_t$ representative of the brake line pressure in the trailer is generated in the second pressure transducer 18. Signal $V_t$ is fed into an inverter 20 before being relayed to an operational amplifier 22. Inverted signal $V_t$ is summed with $V_c$ in the amplifier 22 to give a signal $V_d$. $V_d=0$ when the brake line pressure in the trailer and in the tow vehicle are the same as when normally traveling along a highway. However, upon initiating a brake application in the tow vehicle, the electrical signal for operating the brake light switch will be transmitted through relay 24 to operate the amplifier 22. Now as the brake line pressures and corresponding signal $V_c$ and $V_t$ begin to vary, $V_d$ will also change. $V_d$ is transmitted into a first comparator means 26 and a second comparator means 28. The first comparator means 26 has a threshold level $B_1$ and the second comparator means 28 has a threshold level $B_2$. An electrical switch or electro-mechanical relay 30 is connected to first and second comparator means 26 and 28, respectively. The electrical switch 30 is a three state switch whose output is dependent upon the input supplied from the first comparator means 26 and the second comparator means 28. In a first state, where $B_1$ and $B_2$ are zero, the output from the electrical switch is also zero. In a second state, where $B_1$ is reached and $B_2$ is still zero, the output from the switch 30 will be carried on lead 35 to energize magnet 32. In a third state, where $B_2$ is reached and $B_1$ has reverted to zero, the output from switch 30 will be carried on lead 33 to energize magnet 44. When $V_d > B_2$ the brake line pressure in the trailer is significantly less than the tow vehicle pressure, $B_1$ supplied to electrical switch 30 will energize magnet 32 to overcome spring 34 and bring contact 36 into engagement with contact 38. With contacts 36 and 38 joined together, an operational signal $V_1$ created by the current in the first source 37 and the second source 39, is transmitted to the solenoid operated control valve means 40, see FIG. 3, on lead 42. When $B_1 < V_d < B_2$, the brake line pressure in the tow vehicle 12 and the trailer 14 are not significantly different, a signal from the comparator 26 will operate the electrical switch 30 such that magnet 44 will be energized and move contact 36 into engagement with contact 46 to develop a second operational signal $V_2$, created by the current in the second source 39. When $V_d < 0$, the brake line pressure in the trailer is greater than that of the tow vehicle. With $V_d < 0$ the comparator means 26 and 28 will not operate the switching means 34 and contact 36 will be centrally positioned by spring 34 and spring 48 and terminate the transmission of electrical energy to the solenoid operated control valve means 40.

Although switching means 30 is mechanical, it is recognized that an electronic switch can be utilized in this invention.

Figure 3:
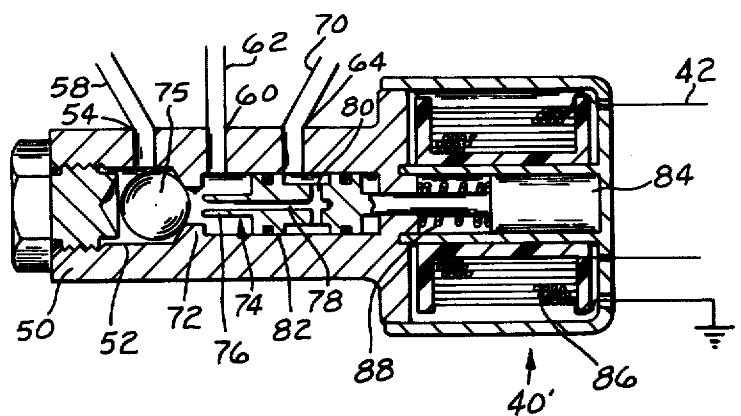
FIG. 3 is a sectional view of a solenoid control valve responsive to the actuation signal.

The solenoid operated control valve means 40 in FIG. 3 has a housing 50 which has a bore 52 therein. The bore 52 has a first port 54 which is connected to a storage container 56 by conduit 58, a second port 60 which is connected to the wheel brakes in the trailer 14 by conduit 62, and a third port 64 which is connected to reservoir 66 in the pumping means 68 by conduit 70. The first port 54 is separated from the second port 60 by a shoulder 72 in the bore 52. A ball 75 is located in the bore 52 and held against shoulder 72 by hydraulic pressure from the storage container 56 to prevent communication between the first port 54 and the second port 60.

A plunger means 74 located in bore 52 has a first end 76 with a passage 78 therethrough to cross bore 80. A first seal 82 located on the first end 76 separates the second port 60 from the third port 64. In the rest position when coil 86 is not receiving any signal from switching means 30, the hydraulic fluid in brake line 62 is free to flow through passage 78 out cross bore 80 and into reservoir 66. The plunger means 74 has a second end 84 with a substantial mass 84 which coil 86 attempts to center upon receiving the operational signal $V_1$. When $V_1$ is received by coil 86, the mass 84 of the plunger means 74 will move toward the center of the coil 86 to bring end 76 into engagement with ball 75 to prevent fluid from flowing in passage 78 from the second port 60 to the third port 64. Further movement of the plunger means 74 will lift the ball 75 off shoulder 72 and allow fluid under pressure to flow from the first port into the second port for operational communication with the wheel brakes in the trailer 14. When $V_2$ is received by coil 86, the centering force on the mass 84 will lessen and the hydraulic pressure communicated through the first port will seat ball 75 on shoulder 72 to maintain a hold condition with respect to the fluid under pressure in brake line 62. With the termination of $V_1$ and $V_2$ from the switch means 30, spring 88 will move the plunger means 74 away from the ball 75 and the fluid under pressure in brake line 62 will be vented to reservoir 66 by way of passage 78.

Figure 4:
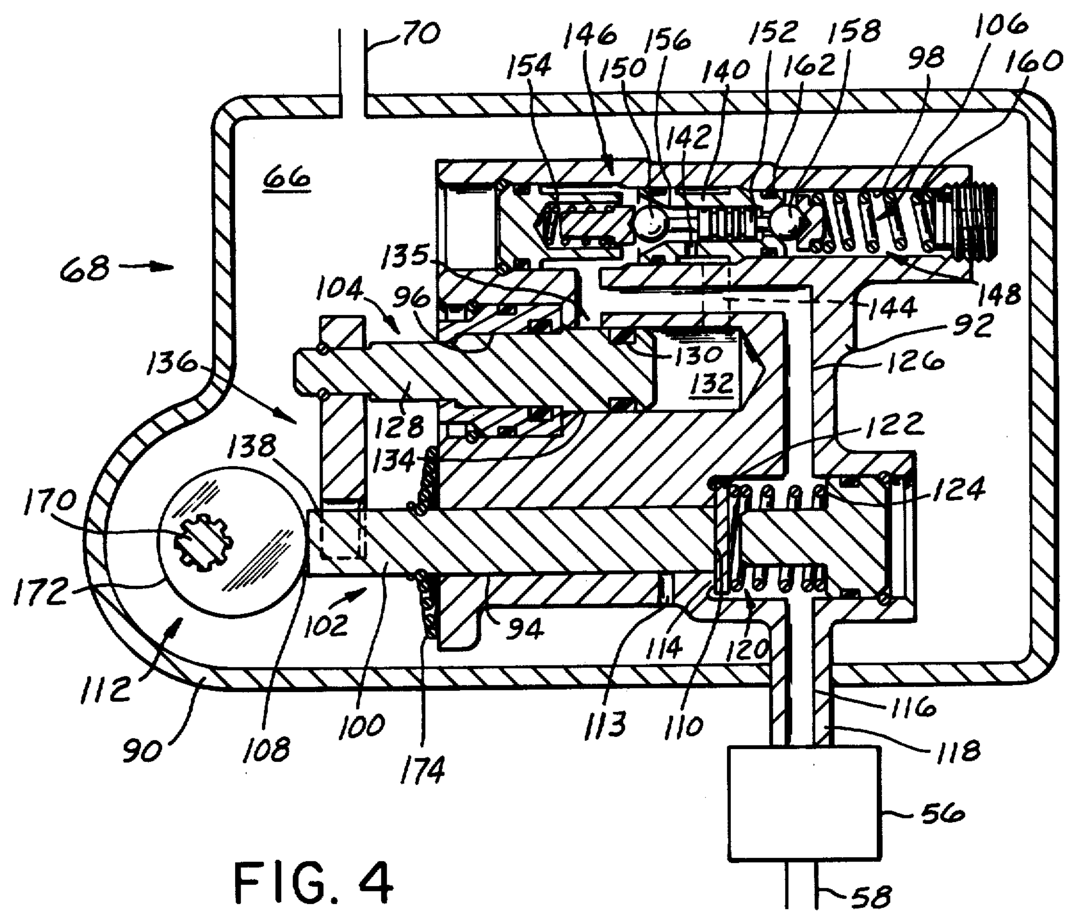
FIG. 4 is a sectional view of a pumping means for use in the trailer braking system.

The pumping means 68, shown in FIG. 4, includes a casing 90 which surrounds a housing 92 to form reservoir 66 for holding fluid. The housing 92 has a first bore 94, a second bore 96, and a third bore 98. A piston means 102 is located in the first bore 94, a lift piston 104 is located in the second bore 96, and a shuttle valve means 106 is located in the third bore 98.

The piston means 102 includes a plunger means 100 which has a head 108 on one end and a face 110 on the other end. The face 110 will move past an entrance port 112 each time plunger means 100 is reciprocated in bore 94 by a cam means 112. A shoulder 114 in the first bore 94 separates the entrance port 112 from an exit port 116. The exit port 116 is connected to the storage container 56 by conduit 118.

A check valve means 120 located in the first bore 94 has a resilient disc 122 held against shoulder 114 by spring 124 to prevent flow from the exit port 116 to the entrance port 112. The bore 94 between shoulder 114 and exit port 116 is connected to the second bore 96 and the third bore 98 by a passage 126.

The lift piston means 104 located in the second bore 96 has a shaft 128 with a first sealing means 130 attached thereto for separating a first chamber 132 from a second chamber 134. The second chamber 134 is connected to passage 126 by port 135. The fluid under pressure available to the storage container 56 can freely flow into this second chamber and act on shaft 128. A lever means 136 fixed to the shaft 128 has a yoke 138 which partially surrounds the head 108 of the plunger means 102.

The shuttle valve means 106 has a cylindrical body 140 which has an opening 142 through which fluid under pressure can pass into passage 144 for communication into the first chamber 132.

A first closure means 146 is located adjacent a first end of the cylindrical body 140 and a second closure means 148 is located adjacent a second end of the cylindrical body 140.

The first closure means 146 includes a ball 150 which is urged against one end of stem 152 by a first spring 154 and toward a first seat 156 on the cylindrical body 140.

The second closure means includes a ball 158 which is urged against the other end of stem 152 by a second spring 160 and into contact with second seat 162 on the cylindrical body 140. Spring 160 is much larger than spring 154 such that the fluid under pressure in conduit 126 will flow past ball 150 through passage 142 into the first chamber 132.

Figure 5:
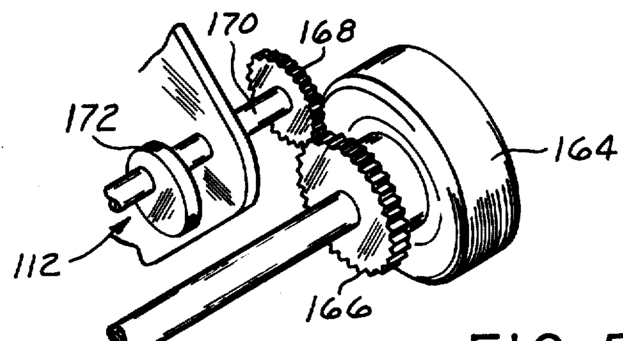
FIG. 5 is a perspective view of the drive wheel on the trailer for operating a fluid pumping means.

The cam means 112 includes a gear 166 attached to a wheel 164 on the trailer 14, see FIG. 5. As the wheel 164 rotates so does gear 166 which drives gear 168 on shaft 170. Shaft 170 extends into the pumping means 68 to rotate the off center gear 172. As cam surface 172 rotates, spring 174 will move head 108 into a following condition causing plunger means 102 to reciprocate in bore 94. When plunger means 102 is at the bottom of the stroke, fluid in reservoir 66 will flow into the entrance port 113. When plunger means 102 is moved past the entrance port 112, the fluid in the bore 94 will be forced past disc 122 by overcoming spring 124. After this has occurred for a period of time, the fluid pressure in the storage container will have reached a predetermined level. This same fluid pressure will act on ball 150 to overcome spring 160 and seal by seating on seat 150. With ball 158 away from seat 162, the fluid in the first chamber 132 will be vented to the reservoir to create a pressure differential across seal 130 on shaft 128 of lift piston means 104. This pressure differential will move shaft 128 in the second bore 96 causing the yoke 138 of the lever means 136 to abut spring 174 and hold plunger means 102 away from the cam means 112.

MODE OF OPERATION OF THE PREFERRED EMBODIMENT

The pumping means 68 will operate whenever the wheel 164 of the trailer is rotating. It has been found that a speed of about 5 miles an hour for a distance of one-fourth mile is sufficient to create enough fluid pressure in storage container 56 to adequately operate the wheel brake on the trailer. However, to bring the fluid pressure in the storage container 56 up to a maximum, the pumping means 68 will operate for a longer time. When the fluid pressure in the reservoir reaches a predetermined value as determined by spring 160 and the seating of ball 150, cam means 112 and plunger means 102 will be disengaged.

When a braking of the tow vehicle-trailer combination is desired, the operator will depress the brake pedal in the tow vehicle causing the brake light switch to send a braking signal by way of relay to amplifier 22. At the same time the fluid pressure in the tow vehicle will begin to build up to allow transducer 16 to create $V_e$. At this point in time $V_t$ from transducer 18 will be zero. $V_d$ from the amplifier 22 will now be a maximum allowing the comparators 26 and 28 to operate switching means 30 to develop $V_1$. With $V_1$ being transmitted on lead 42, solenoid means 40 will close the communication between the second port 60 and the third port 64 and opens the communication between the first port 54 and the second port 60.

Fluid under pressure in the storage container 56 will flow in brake line 62 to operate the wheel cylinders in each of the wheels on the trailer 14. When $V_t$ is built up to a point where it equals $V_e$, $V_d$ will equal 0 and the comparators 26 and 28 will move contact 36 to develop $V_2$. $V_2$ will operate the solenoid valve means 40 to prevent fluid communication between the first port 54, the second port 60, and the third port 64 to maintain a hold position. When the braking force in the tow vehicle subsides $V_t$ will be greater than $V_e$. This will be noted in $V_d$ causing contact 36 to maintain an equilibrium position and terminate the flow of current to the solenoid control valve means 40. With the solenoid valve means 40 de-energized, the fluid in the brake line 62 will flow into reservoir 66 by way of passage 78.

Figure 9:
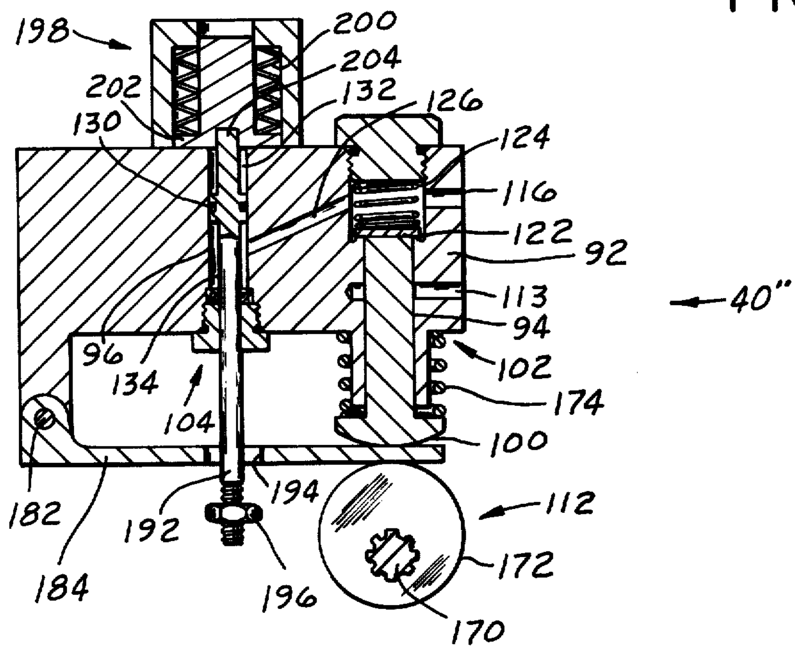
FIG. 9 is a sectional view of another pumping means wherein a lift piston means is controlled by a resilient means.
Figure 6:
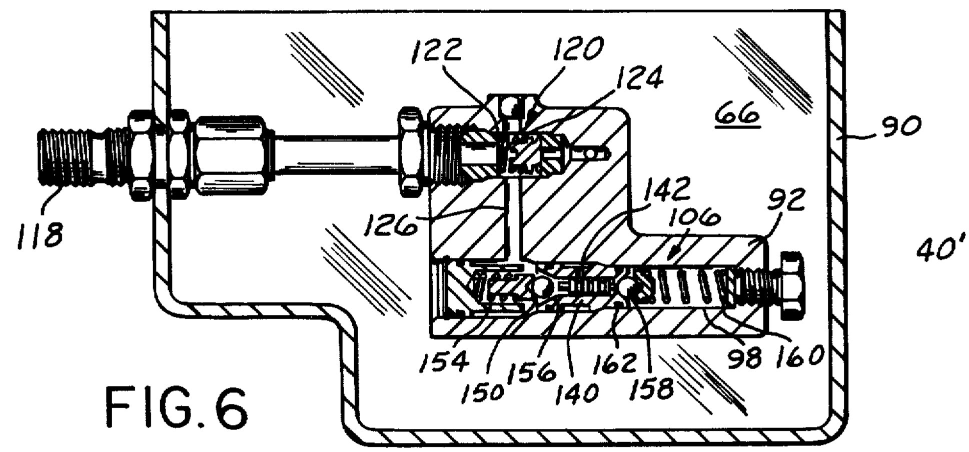
FIG. 6 is a sectional view of a shuttle valve of another pumping means.

In the secondary embodiments of the pumping means shown in FIGS. 6 and 9, like components will be numbered the same.

Figure 7:
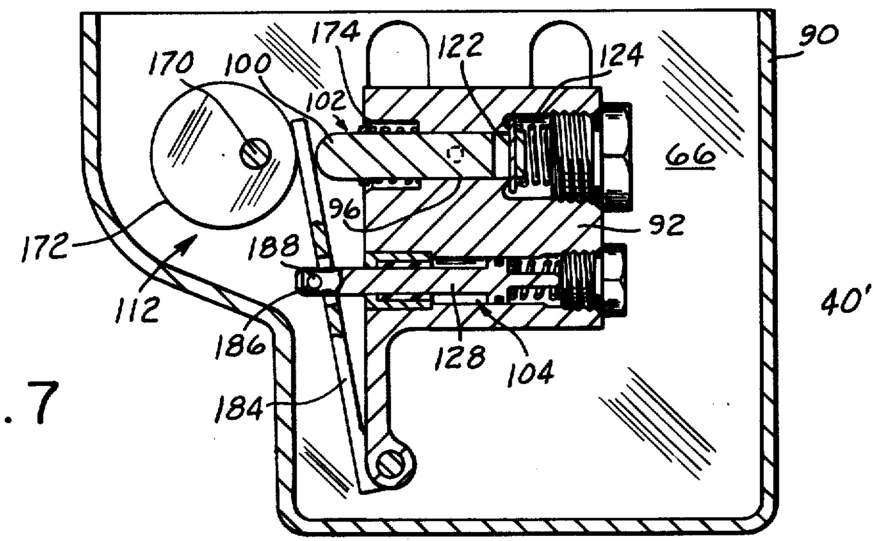
FIG. 7 is another view of the pumping means of FIG. 6 showing the relationship of the plunger means and operational cam.
Figure 8:
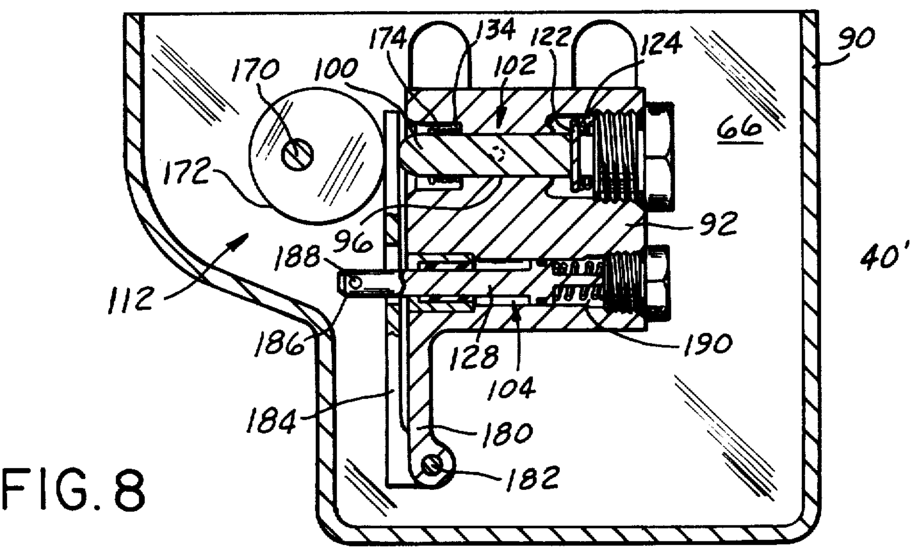
FIG. 8 is a view of the pumping means of FIG. 7 showing the cam means and plunger disengaged by a lift piston means.

In the embodiment shown in FIGS. 6, 7 and 8, the pumping means 40' is the same as the pumping means shown in FIG. 4 with the exception of the relationship between the cam means 112 and the lift piston means 104. The housing 92 has a projection 180 which has a pivot point 182 for securing a lever 184. The lever 184 is positioned between head 100 and the cam gear 172. The lift piston means 104' has a yoke 186 on one end which maintains lever 184 in alignment with the cam means 112. A pin 188 extends through the yoke 186 to enclose the lever therein. As the fluid pressure in the storage container 56 builds up to the predetermined level, shaft 128 will move in opposition to spring 190 to engage pin 188 with lever 184 and hold plunger 102 away from cam surface 172.

In the embodiment shown in FIG. 9, the lift piston means 104'' has an extension 192 which goes through opening 194 in the lever 184. A keeper 196 is adjustable on the extension 192 to keep the plunger means 102 away from the cam means upon the resilient means 198 being overcome by the pressure differential between the first chamber and the second chamber. The first chamber 132 in this embodiment being connected to the reservoir 66 at all times while the second chamber 134 is connected exclusively to the storage container 56.

The resilient means 198 is made of a snap action spring 200 which will hold the keeper 196 against the lever 184 upon collapsing to its solid height. As the fluid under pressure in the storage container is depleted by several brake applications, the snap action spring will expand to push on cap 202 which is connected to end 204 of the lift piston 104. With keeper 196 away from lever 184, cam surface 172 will reciprocate plunger means 102 in bore 92 to build up the fluid pressure in the storage container 56.

We claim:

1. In a tow vehicle-trailer braking system having a valve means for regulating the actuation of the wheel brakes in the trailer in response to an input signal derived by comparing the braking force supplied the wheel brake of the tow vehicle with the braking force supplied the wheel brakes in the trailer, pumping means located in the trailer for maintaining the available braking force therein above a predetermined level, said pumping means comprising:

a housing having a first bore therein, said first bore having an entrance port and an exit port, said entrance port being connected to a reservoir filled with a fluid, said exit port being connected to a storage container;

piston means located in the first bore;

cam means connected to a wheel on the trailer for reciprocating the piston means in said bore upon rotation of said wheel, said piston means upon reciprocating pressurizing the fluid received in said bore through the entrance port before being communicated through the exit port into the storage container to establish said available braking force; and control means responsive to the pressurized fluid in said storage container for disengaging the piston means and the cam means.

2. The tow vehicle-trailer braking system, as recited in claim 1, wherein said piston means includes:

plunger means having a face which opens and closes the entrance port when a head thereon contacts said cam means to produce said reciprocal movement; and spring means connected to said housing for urging the head of the plunger means toward the cam means.

3. The tow vehicle-trailer braking system, as recited in claim 2, wherein said piston means further includes:

check valve means located in said first bore for preventing fluid under pressure from being communicated from the exit port to the entrance port.

4. The tow vehicle-trailer braking system, as recited in claim 2, wherein said control means includes:

lever means located in said housing for holding said plunger means away from the cam means when said predetermined level of braking force is achieved.

5. The tow vehicle-trailer braking system, as recited in claim 4, wherein said control means further includes:

second piston means located in a second bore in the housing, said second bore being connected to said first bore by a passage located between said check valve means and said exit port, said passage communicating the pressurized fluid created in the first bore to the second piston means, said lever means being attached to said second piston means, said second piston means reacting to said fluid under pressure to move in said second bore and hold said lever means in contact with said first piston means to prevent the head from contacting said cam means.

6. The tow vehicle-trailer braking system, as recited in claim 5, wherein said second piston means further includes:

a shaft having a first end located in said second bore;

first sealing means located on the first end of said shaft to form a first chamber with the second bore; and second sealing means located on said shaft between the first sealing means and a second end where the lever means is attached, said first and second sealing means and said second bore forming a second chamber, said second chamber being connected to said passage, said fluid under pressure in the second chamber acting on the shaft.

7. The tow vehicle-trailer braking system, as recited in claim 6, wherein said control means further includes: spring means connected to said first end of the shaft for opposing movement by said fluid under pressure.

8. The tow vehicle-trailer braking system, as recited in claim 6, wherein said control means further includes:

shuttle valve means having a first closure means separated from a second closure means, said first closure means being connected to said passage to receive said fluid under pressure, said second closure means being connected to said first chamber and said reservoir; and resilient means located in said housing for urging said second closure means shut in opposition to the fluid under pressure acting on the first closure means.

9. The tow vehicle-trailer braking system, as recited in claim 8, wherein said shuttle valve includes:

a cylindrical body having a first stem and a second stem, said first stem extending beyond a first seat of the housing, said second stem extending beyond a second seat of the housing.

10. The tow vehicle-trailer braking system, as recited in claim 9, wherein said first closure means includes:

first ball means located adjacent the first seat; and first spring means for urging said first ball means toward said first seat and against the first stem to allow the fluid under pressure to flow into the first chamber to act on the first end of the shaft of the second piston means to prevent the lever means from contacting the first piston means.

11. The tow vehicle-trailer braking system, as recited in claim 10, wherein said second closure means includes:

second ball means located adjacent said second seat; and second spring means for urging said second ball means toward said second seat and against the second stem, said second spring means having a greater compressive force than said first spring means, said second spring means holding said second ball on the second seat until the fluid pressure acting on the first ball means can overcome the second spring means, said second spring upon collapsing allowing the first spring means to hold the first ball means against the first seat to prevent the fluid under pressure from being communicated to the first chamber, said fluid under pressure in the first chamber upon the second ball means moving away from the second seat being vented to the reservoir to allow the fluid under pressure in the second chamber to move the shaft and lever means into engagement with the first piston means to prevent further reciprocation by said cam means.

12. The tow vehicle-trailer braking system, as recited in claim 11, wherein said valve means for regulating the wheel brakes in the trailer includes:

a housing having a bore therein, said bore having a first port connected to said storage chamber containing the fluid under pressure, a second port connected to said wheel brakes in the trailer, and a third port connected to said reservoir; and poppet valve means responsive to said input signal for permitting fluid under pressure to flow through the first port and into the second port in a first mode of operation for terminating the flow through the first port while maintaining the fluid under pressure at the second port in a second mode, and allowing the fluid under pressure at the second port to flow through the third port to the reservoir in a third mode of operation.

13. The tow vehicle-trailer braking system, as recited in claim 12, wherein said poppet valve means includes:

solenoid means responsive to the input signal for positioning the poppet valve means to develop said first, second, and third modes of operation.

14. The tow vehicle-trailer braking system, as recited in claim 13, wherein said input signal is derived from means comprising:

first pressure transducer means located in the trailer and connected to receive the fluid flow from the second port of the housing of the regulating valve means and generate a trailer braking signal;

second pressure transducer means located in the tow vehicle and connected to receive fluid under pressure supplied to operate the wheel brakes of the tow vehicle for generating a tow vehicle braking signal;

comparator means for receiving and evaluating said trailer braking signal with the tow vehicle braking signal to develop said input signal; and switching means connected to said comparator means for transmitting said input signal to the solenoid means.

* * * * *